United States Patent
Koike et al.

(10) Patent No.: US 8,527,610 B2
(45) Date of Patent: Sep. 3, 2013

(54) CACHE SERVER CONTROL DEVICE, CONTENT DISTRIBUTION SYSTEM, METHOD OF DISTRIBUTING CONTENT, AND PROGRAM

(75) Inventors: Masahiro Koike, Tokyo (JP); Junichi Gokurakuji, Tokyo (JP)

(73) Assignee: NEC Corporation, Tokyo (JP)

( * ) Notice: Subject to any disclaimer, the term of this patent is extended or adjusted under 35 U.S.C. 154(b) by 409 days.

(21) Appl. No.: 13/013,217

(22) Filed: Jan. 25, 2011

(65) Prior Publication Data
US 2011/0202633 A1    Aug. 18, 2011

(30) Foreign Application Priority Data
Feb. 18, 2010    (JP) .................. 2010-034039

(51) Int. Cl.
- G06F 15/16 (2006.01)
- G06F 15/167 (2006.01)
- G06F 15/173 (2006.01)
- H04N 7/173 (2011.01)
- H04N 7/16 (2011.01)

(52) U.S. Cl.
USPC ............... 709/219; 725/92; 725/94; 725/145; 725/146; 725/147; 709/213; 709/224; 709/231

(58) Field of Classification Search
USPC ........................................................ 709/219
See application file for complete search history.

(56) References Cited

U.S. PATENT DOCUMENTS

| | | | |
|---|---|---|---|
| 7,191,215 B2 * | 3/2007 | Ganesan et al. | 709/204 |
| 8,272,020 B2 * | 9/2012 | Watson et al. | 725/96 |
| 8,281,349 B2 * | 10/2012 | Takezawa | 725/92 |
| 2003/0217113 A1 * | 11/2003 | Katz et al. | 709/213 |
| 2007/0192474 A1 * | 8/2007 | Decasper et al. | 709/223 |

FOREIGN PATENT DOCUMENTS

| | | |
|---|---|---|
| JP | 2007080161 A | 3/2007 |
| JP | 2008072484 A | 3/2008 |
| JP | 2009033760 A | 2/2009 |
| JP | 2009165118 A | 7/2009 |
| JP | 2009182629 A | 8/2009 |
| JP | 2009237918 A | 10/2009 |

* cited by examiner

*Primary Examiner* — Wing F Chan
*Assistant Examiner* — David X Yi

(57) ABSTRACT

A cache server control device selects cache servers necessary for storing contents to be reproduced, and allows the selected cache servers 300 store the contents to be reproduced; the cache server control device herein uses a first threshold value when the number of units of the cache servers, for storing the content to be reproduced related to the judgment, is increased; and uses a second threshold value, being smaller than the first threshold value, when the number of units of the cache servers, for storing said content to be reproduced related to the judgment, is decreased.

11 Claims, 13 Drawing Sheets

| CONTENT IDENTIFICATION INFORMATION | CONTENT TO BE REPRODUCED |
|---|---|
| 001 | 001.××× |
| 002 | 002.××× |
| 003 | 003.××× |
| ⋮ | ⋮ |

| CACHE SERVER NUMBER | 1 |
|---|---|
| CONTENT IDENTIFICATION INFORMATION | CONTENT TO BE REPRODUCED |
| 001 | 001.×××  |
| 003 | 003.××× |

FIG. 4                                                          400

| CONTENT IDENTIFICATION INFORMATION | SERVER IDENTIFICATION INFORMATION |
|---|---|
| 001 | CACHE SERVER 1 |
| 002 | DISTRIBUTION SERVER |
| 003 | CACHE SERVERS 1, 2 |
| ⋮ | ⋮ |

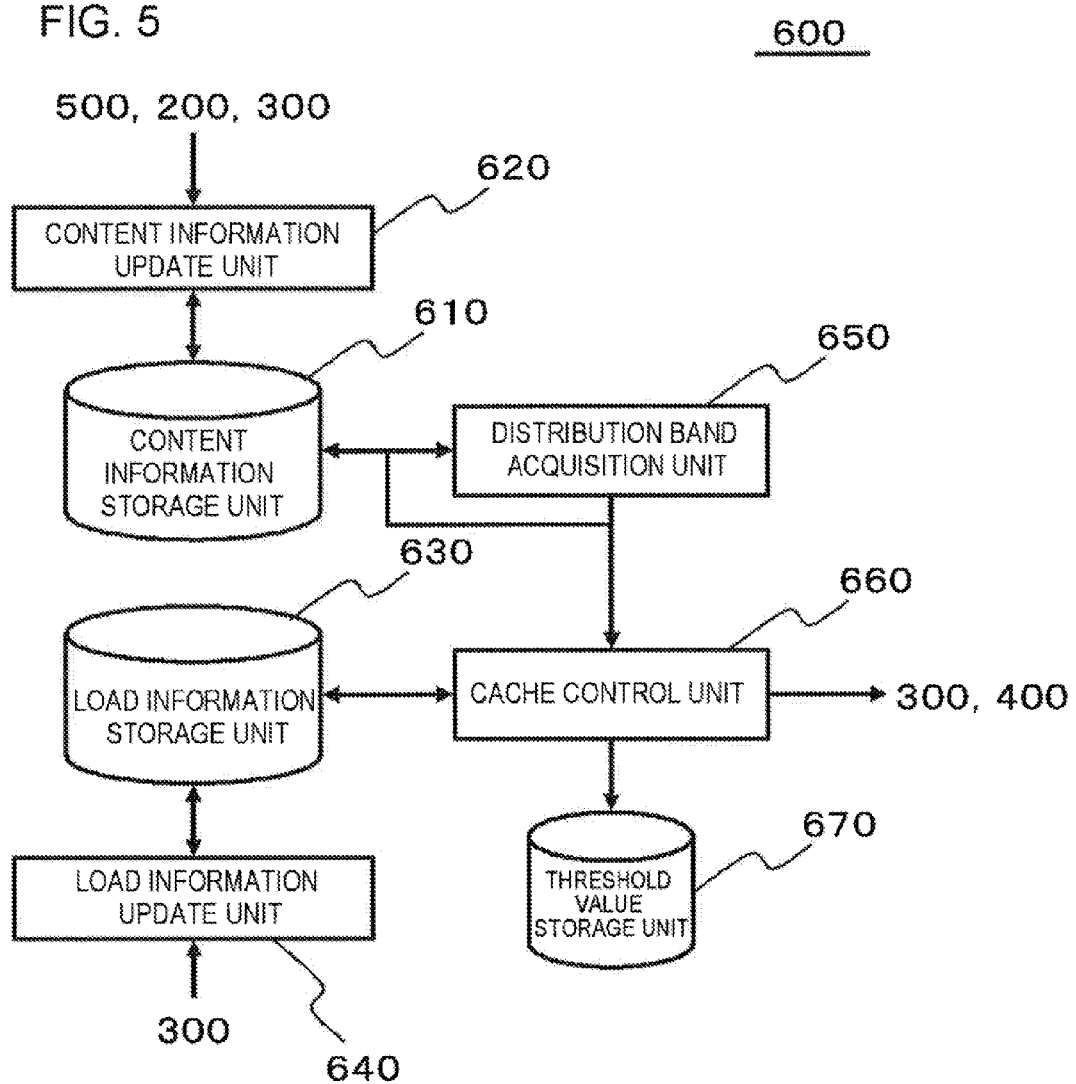

FIG. 6                                                                                       610

| CONTENT IDENTIFICATION INFORMATION | CACHE SERVER NUMBER | BIT RATE | DATE OF INCREMENT OF CACHE SERVER |
|---|---|---|---|
| 001 | 1 | 25Mbps | DAY◯, MONTH × 24:00 |

| DATE | NUMBER OF DISTRIBUTION REQUEST | DISTRIBUTION BAND (DISTRIBUTION LOAD) |
|---|---|---|
| DAY◯, MONTH◯ 12:00 | 20 | 500Mbps |
| DAY◯, MONTH◯ 12:30 | 24 | 600Mbps |
| DAY◯, MONTH◯ 13:00 | 30 | 750Mbps |
| ⋮ | ⋮ | ⋮ |

FIG. 7                                                   630

| CACHE SERVER NUMBER | DISTRIBUTION BAND (DISTRIBUTION LOAD) |
|---|---|
| 1 | 1000Mbps |
| 2 | 750Mbps |
| 3 | 300Mbps |
| ⋮ | ⋮ |

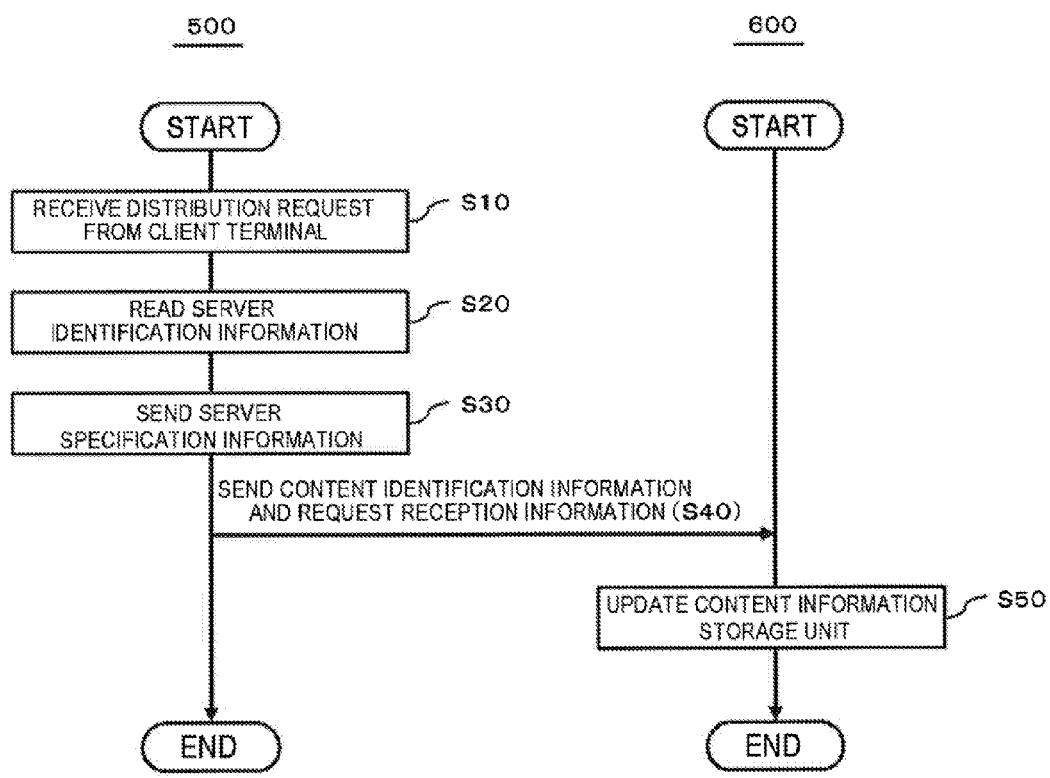

| CONTENT IDENTIFICATION INFORMATION | CACHE SERVER NUMBER | DATE OF INCREMENT OF CACHE SERVER |
|---|---|---|
| 001 | 1 | DAY◯, MONTH × 24:00 |

| DATE | NUMBER OF DISTRIBUTION REQUEST (DISTRIBUTION LOAD) |
|---|---|
| DAY◯, MONTH◯ 12:00 | 20 |
| DAY◯, MONTH◯ 12:30 | 24 |
| DAY◯, MONTH◯ 13:00 | 30 |
| ⋮ | ⋮ |

FIG. 13                                                    630

| CACHE SERVER NUMBER | QUANTITY OF DISTRIBUTION (DISTRIBUTION LOAD) |
|---|---|
| 1 | 20 |
| 2 | 35 |
| 3 | 50 |
| ... | ... |

CACHE SERVER CONTROL DEVICE, CONTENT DISTRIBUTION SYSTEM, METHOD OF DISTRIBUTING CONTENT, AND PROGRAM

This application is based on Japanese patent application No. 2010-03234039 the content of which is incorporated hereinto by reference.

BACKGROUND

1. Technical Field

The present invention relates to a cache server control device which controls cache servers used in a content distribution system, a content distribution system, a method of distributing content, and a program.

2. Background Art

Recently, the speed of data communication network, such as the Internet, has been upgraded. It has also become possible to transmit video contents by high-vision broadcasting with high image quality, by virtue of adoption of H.264/AVC codec. IPTV services may, therefore, be expected to be brought into full operation.

VOD (Video On Demand) service is one of such IPTV service. A content distribution system for realizing the service is configured by a content storage which stores video contents, and a distribution server which distributes the video contents. On the other hand, the content distribution system is required to distribute video contents in a stable manner to a large number of subscribers. A variety of technologies for fulfilling the requirement have been developed.

For example, Japanese Laid-Open Patent Publication No. 2009-182629 discloses a technology of preliminarily allocating to distribution servers, contents which satisfy specific conditions. Japanese Laid-Open Patent Publication No. 2009-165118 discloses a technology of placing the contents in local caches of user terminals before viewing such contents. Japanese Laid-Open Patent Publication No. 2808-072484 discloses a technology of preliminarily predicting a time zone in which loads of the instruments which hold video contents will become heavier in a home area network system, and moving the video contents to other instruments before getting into the time zone.

Japanese Laid-Open Patent Publication No. 2009-033760 discloses a technology of preliminary placing head chunks of the contents in local caches. Japanese Laid-Open Patent Publication No. 2007-080161 discloses a technology of separately holding the full contents and the head portions of the contents, and allowing the clients to concurrently download the full contents and the head portions of the contents.

Japanese Laid-Open Patent Publication No. 2009-237918 discloses a technology of supervising loads of local servers which distribute the contents, and determining the number of contents to be copied to local servers depending on the loads, thereby preparing a copy schedule.

SUMMARY

In order to distribute, contents to be reproduced to the client terminals in a stable manner, it is preferable to provide cache servers besides the distribution servers, and to allow the cache servers preliminarily to store the contents to be reproduced which are considered to heavily load the distribution servers. In this case, it is necessary to delete the contents to be reproduced whose the distribution load is reduced. However, frequent storage and deletion of the contents to be reproduced, to or from the cache servers, may heavily load the cache servers.

It is therefore an object of the present invention to provide a cache server control device, a content distribution system, a method of distributing content, and a program, capable of suppressing frequency of storage and deletion of the contents to be reproduced, to or from the cache servers.

According to the present invention, the is provided a cache server control device which is used for a content distribution system, and the content distribution system herein comprising:

a content storage device which stores a plurality of contents to be reproduced, necessary to be distributed to client terminals;

a distribution server which reads the plurality of contents to be reproduced out from the content storage device and distributes them to the client terminals; and a plurality of cache servers which preliminarily store at least one of the plurality of contents to be reproduced, and distribute it to the client terminals, the cache server control device which is configured to lodes which of the contents to be reproduced is stored in the cache servers, and comprising:

distribution load acquisition unit which acquires load information representing distribution load, for when for concurrently distributing the contents to be reproduced to the plurality of client terminals in response to a plurality of distribution requests issued for the contents to be reproduced, respectively for the plurality of contents to be reproduced; and a cache control unit which updates the number of units of cache servers necessary for storing the contents to be reproduced, by comparing the load information acquired by the distribution load acquisition unit with a threshold value determined in a multi-level manner, and the cache control unit herein is configured to use:

uses a first value of the threshold, value when the number of units of the cache servers, for storing said content to be reproduced related to the judgment is increased; and a second value of the threshold value, being smaller than the first threshold value, when the number of units of the cache servers, for storing said content to be reproduced related to the judgment is decreased.

According to the present invention, there is provided a content distribution system which comprises:

a content storage device which stores a plurality of contents to be reproduced, necessary to be distributed to client terminals;

a distribution server which reads a plurality of contents to be reproduced out from said content storage device, and distributes them to the client terminals;

a plurality of cache servers which preliminarily store at least one of the plurality of contents to be reproduced, and distribute it to the client terminals; and a cache server control, device configured to judge which of the contents to be reproduced is stored in the cache servers, and wherein the cache server control device herein comprises:

a distribution band acquisition unit which acquires load information representing distribution load, for when for concurrently distributing the contents to be reproduced to the plurality of client terminals, in response to a plurality of distribution requests issued for the contents to be reproduced, respectively for the plurality of contents to be reproduced; and a cache control unit which updates the number of units of cache servers necessary for storing the contents to be reproduced, by comparing the load information acquired by the distribution load acquisition unit with a threshold value determined in a multi-level manner, and wherein the cache control unit herein is configured to use:

a first value of the threshold value when the number of units of the cache servers, is configured to use:

a first value of said threshold value when the number of units of said cache servers, for storing the content to be reproduced related to the judgment, is increased; and a second value of the threshold value, being smaller than the first threshold value, when the number of units of the cache servers, for storing the content to be reproduced related to the judgement, is decreased.

According to the present invention, there is provided a method of distributing content which comprises the steps of:

allowing a content storage device to preliminarily store a plurality of contents to be reproduced which are to be distributed to client terminals;

allowing a distribution server to read the plurality of contents to be reproduced out from the content storage device and to distribute them to the client terminals;

allowing a plurality of cache servers to preliminarily store at least one of the plurality of contents to be reproduced, and to send it to the client terminal; and allowing a cache server control device, configured to judge which of the contents to be reproduced is stored in the cache servers, to acquire a distribution load, for when for concurrently distributing the contents to be reproduced to the plurality of client terminals, in response to a plurality of distribution requests issued for the contents to be reproduced, respectively for the plurality of contents to be reproduced, and to update the number of units of the cache servers necessary for storing the contents to be reproduced, by comparing the thus-acquired distribution load with a threshold value determined in a multi-level manner, and the cache server control device herein comprises:

a first value of the threshold value when the number of units of the cache servers, for storing the content to be reproduced related to the judgment, is increased; and a second value of the threshold value, being smaller than the first threshold value, when the number of units of the cache servers, for storing said content to be reproduced related to the judgment, is decreased.

According to the present invention, there is provided a program for realizing a cache server control device which is used for a content distribution system, the content distribution system herein comprising:

a content storage device which stores a plurality of contents to be reproduced, necessary to be to client terminals;

a distribution server which reads the plurality of contents to be reproduced out from the content storage device and distributes them to the client terminals; and a plurality of cache servers which preliminarily store at least one of the plurality of contents to be reproduced, and distribute it to the client terminals, and the cache server control device herein is configured to judge which of the contents to be reproduced is stored in the cache servers, and wherein the program is configured to allow a computer to realize:

a function of acquiring load information representing distribution load, for when for concurrently distributing the contents to be reproduced to the plurality of client terminals in response to a plurality of distribution requests issued for the contents to be reproduced, respectively for the plurality of contents to be reproduced; and a function of updating the number of units of the cache servers necessary for storing the contents to be reproduced, by comparing the thus-acquired distribution load with a threshold value determined in a multi-level manner, wherein the program is further configured to allow a computer to:

use a first value of the threshold value when the number of units of the cache servers, for storing said content to be reproduced related to the judgment, is increased; and use a second value of the threshold value, smaller than the first threshold value, when the number of units of the cache servers, for storing said content to be reproduced related to the judgment, is decreased.

According to the present invention, the cache servers may be prevented from being so frequently accessed for storage and deletion of the contents to be reproduced.

BRIEF DESCRIPTION OF THE DRAWINGS

The above and other objects, advantages and features of the present invention will be more apparent from the following description of certain preferred embodiments taken in conjunction with the accompanying drawings, in which;

FIG. 2 is a drawing illustrating, in a table form, a data configuration of information stored by a content storage;

FIG. 3 is a drawing illustrating, in a table form, a data configuration of information stored by cache servers;

FIG. 4 is a drawing illustrating, in a table form, a data configuration of information stored by a database;

FIG. 5 is a block diagram illustrating a functional configuration of a cache server control device;

FIG. 6 is a drawing illustrating, in a table form, data stored by a content information storage unit;

FIG. 7 is a drawing illustrating, in a table form, information stored by a load information storage unit;

FIG. 8 is a drawing illustrating a first operation of the content distribution system illustrated in FIG. 1;

FIG. 12 is a drawing illustrating, in a table form, a data configuration of content information storage unit in a second embodiment; and FIG. 13 is a drawing illustrating, in a table form, a data configuration of a load information storage unit according to a second embodiment.

DETAILED DESCRIPTION

Figure 1:
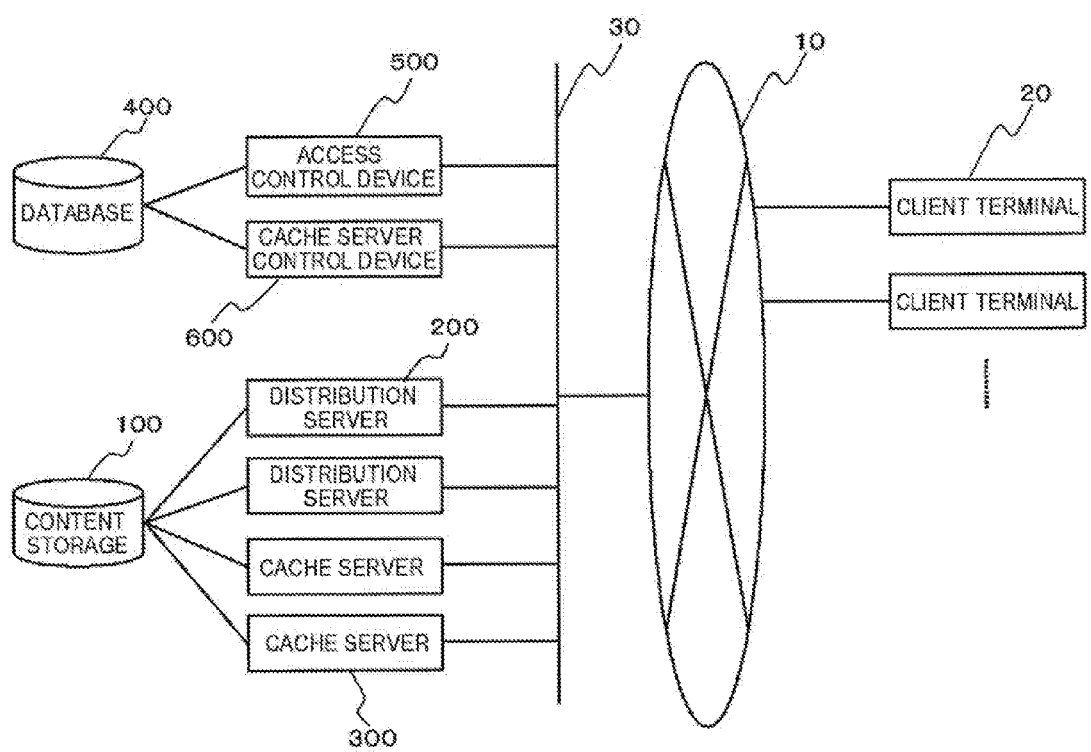
FIG. 1 is a block diagram illustrating a configuration of a content distribution system according to a first embodiment.

The invention will now be described herein with reference to illustrative embodiments. Those skilled in the art will recognize that many alternative embodiments can be accomplished using the teachings of the present invention and that the invention is not limited to the embodiments illustrated for explanatory purposes.

Embodiments of the present invention will be explained referring to the attached drawings. Note that all similar constituents in all drawings will be given similar reference numerals or symbols, so as to occasionally avoid repetitive explanations.

First Embodiment

FIG. 1 is a block diagram illustrating a configuration of a content distribution system according to a first embodiment. The content distribution system is a system configured to distribute a plurality of contents to be reproduced, such as video contents and voice contents stored in content storage device (content storage) 100, through a communication network 10 such as the Internet, to client terminals 20. The contents to be reproduced are assigned with content identification information. The content identification information is used for identifying a plurality of contents to be reproduced from each other.

The content distribution system has, besides the content storage 100, at least one distribution server 200, a plurality of cache servers 300, and a cache server control device 600. The distribution server 200 reads a plurality of contents to be reproduced out from the content storage 100, and distributes them to the client terminals 20. The cache server 300 preliminarily stores (caches) at least one of the plurality of contents to be reproduced, and distributes it to the client terminals 20.

The cache server control device 600 judges which contents to be reproduced should be stored into which cache servers 300. The cache server control device 600 acquires a distribution load respectively for the plurality of contents to be reproduced. The distribution load is the one used for concurrently distributing the same content to be reproduced to the plurality of client terminals 20, when receiving the distribution requests for the same content to be reproduced, respectively from the plurality of client terminals 20. The cache server control device 600 then determines the number of units of cache server 300 necessary for storing the contents to be reproduced, based on the thus-acquired distribution load. The cache server control device 600 selects the cache servers 300 necessary for storing the contents to be reproduced, and allows the selected cache servers 300 to store the contents to be reproduced. The cache server control device 600 herein uses a first threshold value, when the number of nits of cache server 300 for storing the content to be reproduced related to the judgment is increased, and uses a second threshold value, smaller than the first threshold value, when the number of units of cache server 300 for storing the content to be reproduced related to the judgment is decreased.

The content distribution system additionally has a database 400 and an access control device 500. The database 400 stores server specification information, indicating which distribution server 200 or which cache server 300 should distribute which contents to be reproduced, while correlating it with the content identification information. The database 400 is updated by the cache server control device 600.

The access control device 500 receives the distribution requests sent by the client terminals 20 to the content distribution system. The distribution requests are assigned with the content identification information. The access control device 500 reads from the database 400, the server specification information with respect to the content identification information, and sends it to the client terminals 20 which previously sent the distribution requests. The server specification information is typically an URL. When the server specification information is given by an URL, the URL is specified to a depth of hierarchy by which the contents to be reproduced may be specified. Upon reception of the distribution requests for either one of the contents to be reproduced from the client terminals 20, the access control device 800 sends to the cache server control device 600, content identification information of the content to be reproduced, while correlating it with request reception information which indicates reception of the distribution request. As detailed later, the cache server control device 600 acquires the distribution load, respectively for the contents to be reproduced, by using the request reception information.

Note that the distribution servers 200, the cache servers 300, the access control device 500, and the cache server control device 600 are connected with each other through a communication network 30 such as intranet.

FIG. 2 is a drawing illustrating, in a table form, a data configuration of information stored by the content storage 100. The content storage 100 stores the contents to be reproduced while correlating them with the content identification information. The content storage 100 stores all contents to be reproduced which should be distributed by the content distribution system illustrated in FIG. 1.

FIG. 3 is a drawing illustrating, in a table form, a data configuration of information stored by the cache servers 300. Each cache server 300 is assigned with a cache server number, as cache server identification information used for identifying a plurality of cache servers 300 from each other. The cache servers 300 store the contents to be reproduced to which a large number of distribution requests are issued, while correlating them with the content identification information. The contents to be reproduced stored by the cache servers 300 are different from cache server 300 to cache server 300. For the case where the server specification information is given by an URL, the cache server 300 stores the contents to be reproduced while correlating them with the URL. The URL is specified with respect to each of the contents to be reproduced.

FIG. 4 is a drawing illustrating, in a table form a data configuration of information stored by the database 400.

The database 400 stores the content identification information, while correlating it with the server specification information, indicating that from which server the contents to be reproduced are distributed, such as cache server numbers, respectively for contents to be reproduce.

FIG. 5 is a block diagram illustrating a functional configuration of the cache server control device 600. The cache server control device 600 has a distribution load acquisition unit 650 and a cache control unit 660. The distribution load acquisition unit 650 acquires a distribution load, respectively for plurality of contents to be reproduced. In this embodiment, the distribution load means distribution band. The distribution band is the one used for concurrently distributing the same content to be reproduced to the plurality of client terminals 20, when receiving the distribution requests for the same content to be reproduced, from the plurality of client terminals 20, respectively. The cache control unit 660 then determines the number of units of cache server 300 necessary for storing the contents to be reproduced, based on the distribution load (distribution band) acquired by the distribution load acquisition unit 650. The number of units determined herein can be zero for some cases.

The cache server control device 600 additionally has a content information storage unit 610, a content information update unit 620, a load information storage unit 630, a load information update unit 640, and a threshold value storage unit 670.

The content information storage unit 610 stores the cache information which indicates which contents to be reproduced are stored in which cache servers 300, respectively for the plurality of contents to be reproduced. The content information storage unit 610 also serves as a bit rate storage unit and a distribution request storage unit. More the content information storage unit 610 stores bit rates of the contents to be reproduced and currently valid number of his requests, while correlating them with the contents identification information, respectively for the plurality of contents to be reproduced. The distribution band provided respectively for the contents to be reproduced may be calculated by multiplying the bit rate and the number of distribution requests. The distribution band is calculated typically by the content information update unit 620.

Upon reception of the request reception information and the content identification information from the access control device 500, the content information update unit 620 updates the information stored by the content information storage unit 610. More specifically, upon reception of the request reception information and the content identification information from the access control device 500, the content information update unit 620 increases the number of distribution requests corresponding to the received content identification information by one.

The content information update unit 620 also receives distribution end information, which indicates that the distribution of the contents to be reproduced ended, from the distribution servers 200 or the cache servers 300, while correlating them with the content identification information of the contents to be reproduced. The content information update unit 620 then updates the content information storage unit 610, and decreases the number of distribution requests corresponding to the received content identification information by one.

The load information storage unit 630 stores load information which indicates loads of the cache servers, respectively for the plurality of cache servers 300. The load information update unit 640 periodically acquires information which indicates distribution loads (distribution bands, for example) of the cache servers 300, respectively from the plurality of cache servers 300, and periodically updates the load information storage unit 630 by using the thus-acquired information.

The threshold value storage unit 670 stores the first threshold value and the second threshold value of the distribution hands. The threshold values are used when the cache control unit 660 determines the number of units of cache server 300, respectively for the contents to be reproduced.

Note that FIG. 5 does not illustrate portions which are not essential to the present invention. The individual constituents of the cache server control device 600 illustrated in FIG. 5 are expressed on the basis of functional blocks, rather than on the hardware basis. The individual constituents of the cache server control device 600 are realized by arbitrary combinations of hardware and software, represented by CPU of arbitrary computer, memory, program for realizing the constituents of the present invention loaded in the memory, storage unit such as hard disk for storing the program, and interface for networking.

FIG. 6 is a drawing illustrating, in a table form, data stored by the content information storage unit 610 of the cache server control device 600. The con ent information storage unit 610 stores the content identification information, cache server numbers of the cache servers 300 which store the contents to be reproduced, distribution bands, bit rates, the number of distribution requests, and history information of the distribution loads, respectively for the contents to be reproduced. The distribution bands are given as values obtained by multiplying the bit rates and the number of distribution requests. The history information of the distribution bands is typically composed of the number of distribution requests and the distribution bands at certain date and time, while being correlated with such date-and-time information.

The content information storage unit 610 also stores the latest date and time at which the number of units of cache server 300 storing the contents to be reproduced were increased, respectively for the contents to be reproduced.

FIG. 7 is a drawing illustrating, in a table form, information stored by the load information storage unit 630. The load information storage unit 630 stores the cache server numbers, and the distribution bands which indicate the loads of the cache servers 300 in a mutually correlated manner, respectively for the plurality of cache servers 300.

FIG. 8 is a drawing illustrating a first operation of the content distribution system illustrated in FIG. 1. The operation represents the one to be executed upon reception of the distribution requests of contents from the client terminals 20.

Each client terminal 20 sends the distribution request of the content to the access control device 500, while correlating it with the content identification information. Upon reception of the distribution request and the content identification information (step S10), the access control device 500 reads the server specification information, corresponding to the received content identification information, out from the database 400 (step S20), and then sends the thus-read server specification information to the client terminal 20 (step 230).

While not illustrated in the drawing, upon reception of the server specification information from the access control device 500, the client terminal 20 makes an access to the distribution server 200 or the cache server 300, by using the thus-received server specification information. The accessed distribution server 200 or the cache server 300 starts distribution of the content to be reproduced to the client terminal 20.

After sending the server specification information to the client terminal 20, the access control device 500 sends the content identification information received in step S10 to the cache server control device 600, while correlating it with the request reception information (step S40). Upon reception of the content identification information and the request reception information from the access control device 500, the content information update unit 620 of the cache server control device 600 updates the content information storage unit 610, and increases the number of distribution requests corresponding to the received content identification information by one (step S50).

Upon completion of the distribution of the content to be reproduced to the client terminal 20, the distribution server 200 or the cache server 300 sends the distribution end information to the cache server control device 600, while correlating it with the content identification information of the content to be reproduced. Upon reception of the distribution end information from the distribution server 200 or the cache server 300, in a form correlated with the content identification information, the content information update unit 620 of the cache server control device 600 updates the content information storage unit 610, and decreases the number of distribution requests corresponding to the received content identification information by one.

Figure 9:
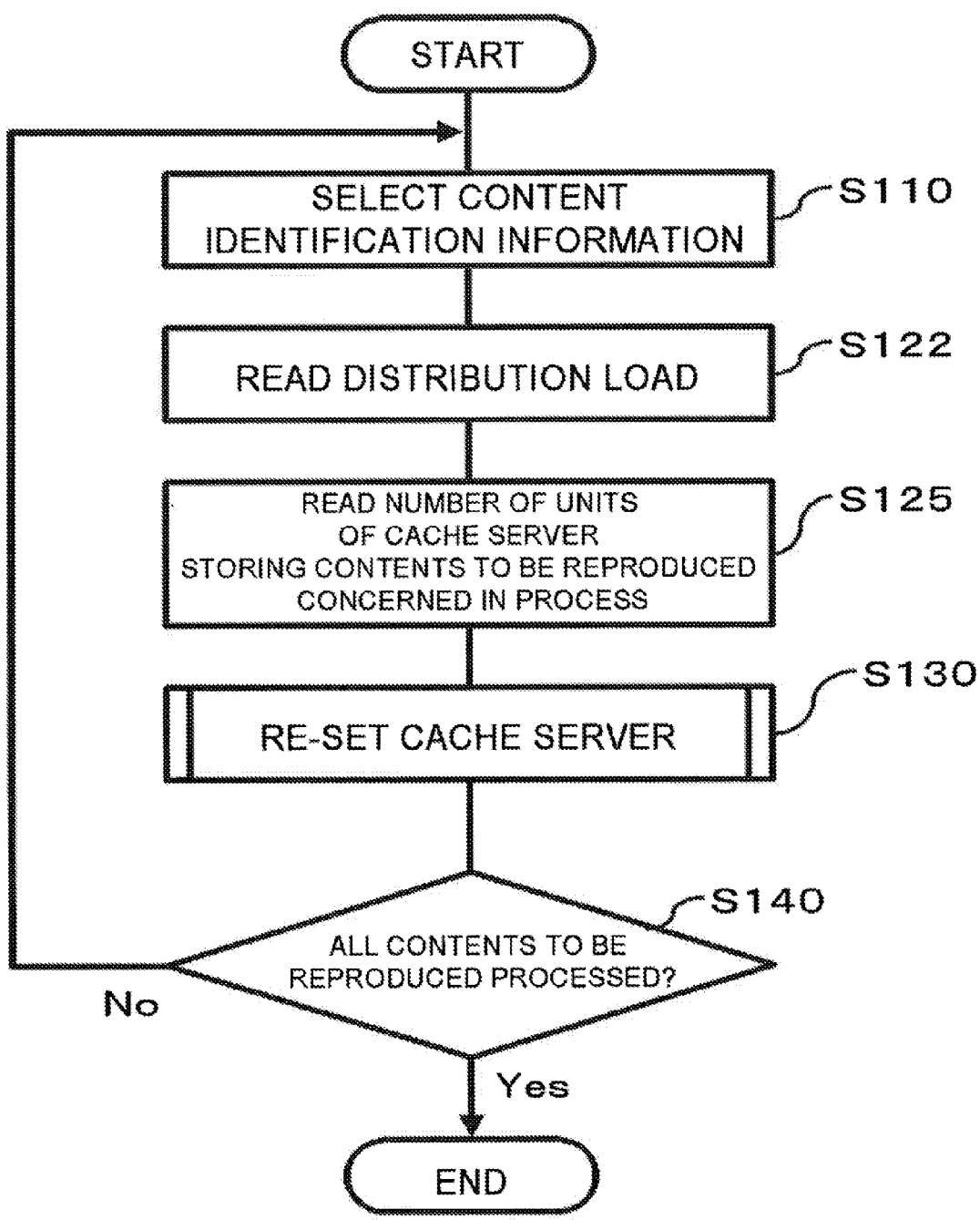
FIG. 9 is a drawing illustrating a second operation of the content distribution system illustrated in FIG. 1.

FIG. 9 is a drawing illustrating a second operation of the content distribution system illustrated FIG. 1. The operation is the one executed by the cache server control device 600 when it modifies setting of the cache servers 300. The processes illustrated in this drawing is periodically executed.

The distribution load acquisition unit 650 of the cache server control device 600 selects one content identification information (step S110). The distribution load acquisition unit 650 reads, the distribution band corresponding to the selected content identification information, out from the content information storage unit 610. The distribution load acquisition unit 650 herein reads the maximum value of the distribution band found in every check periods, each of which is defined by a predetermined length of time, based on such a predetermined check period basis (step S122). This process is executed by using the history information of the distribution band. Each of the check period is typically defined by an integer multiple of 24 hours.

The distribution acquisition unit 650 also reads out from the content information storage unit 610, the current number of units of cache server 300 which store the content to be reproduced corresponding to the selected content identification information (step S125). The number of units is determined typically based on how many cache server numbers are stored with respect to the selected content identification information in the content information storage unit 610.

Next, the distribution load acquisition unit 650 outputs the thus-read distribution band and the number of units of cache server 300 to the cache control unit 660, while correlating it with the content identification information. The cache control unit 660 re-sets the cache servers 300 by using the information received from the distribution load acquisition unit 650 (step S130).

The distribution load acquisition unit 650 and the cache control unit 660 repeat all processes from step S110 to step S130, for all of the content identification information (step S140).

Figure 10:
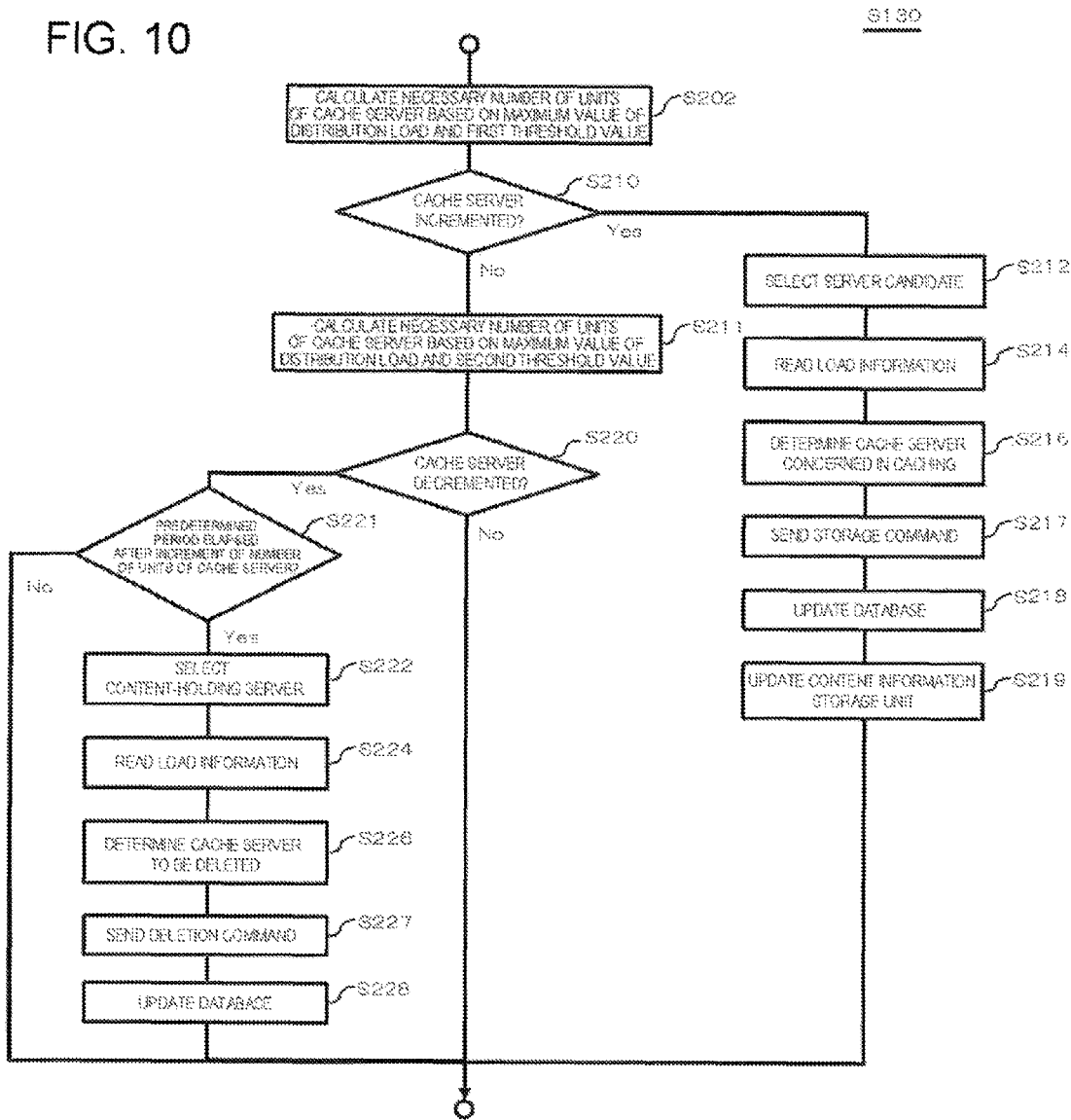
FIG. 10 is a flow chart illustrating details of step S130 in FIG. 9.

FIG. 10 is a flow chart illustrating details of the processes in step S130 in FIG. 9, that is, the re-setting processes of the cache servers 300 executed by the cache control unit 660. The cache control unit 660 reads information which determines the first threshold value and the second threshold value out from the threshold value storage unit 670. Each of the first threshold value and the second threshold value is set in a multi-level manner.

More specifically, the threshold value storage unit 670 stores a certain reference value, a first constant, and a second constant. The second constant is smaller than the reference value. Values obtained by adding the constant to each of integer multiples of the reference value, respectively, are used as the first threshold value. Values obtained by subtracting the second constant from the first threshold value, respectively, are used as the second threshold value.

First, the cache control unit 660 compares the maximum value of the distribution band acquired from the distribution load acquisition unit 650, with the first threshold value read out from the threshold value storage unit 670, and determines a necessary number of units of cache number of units of cache server, by judging which level of the threshold value the distribution band exceeds. More specifically, the cache control unit 660 calculates a necessary number of units of cache server 300, by subtracting the first constant from the maximum value of the distribution band, dividing such a difference by the reference value, and omitting decimals from the quotient calculated therefrom (step S202).

The cache control unit 660 judges whether the number of units of cache server 300 calculated in step S200 exceeds the current number of units of cache server 300 acquired from the distribution band acquisition unit 650, or not (step S210). If exceeding (step S210: Yes), the cache control unit 660 reads, the cache server number corresponding to the content identification information acquired from the distribution band acquisition unit 650, out from the content information storage unit 610. The cache control unit 660 then selects the cache servers 300 assigned with numbers other than the thus-read cache server number, that is, the cache servers 300 which do not store the contents to be reproduced related to the judgment, as server candidates (step S212).

Next, the cache control unit 660 recognizes the cache server numbers of the server candidates, and reads the load information (or distribution bands) corresponding to the recognized cache server numbers out from the load information storage unit 630 (step S214). The cache control unit 660 also recognizes the difference between the number of units of cache server 300 calculated in step S200 and the current number of units, as the number of units of cache server 300 to be added. The cache control unit 660 then recognizes loads on the individual server candidates by using the thus-read load information, and selects a necessary number of units of the server candidates in an increasing order of load. In this way, the cache servers 300, required to cache the content to be reproduced related to the processing, are determined (step S216).

Next, the cache control unit 660 sends the content identification information, acquired from the distribution band acquisition unit 650, to the cache servers 300 having cache server numbers selected in step S216, together with a storage command which asks the cache servers 300 to read out from the content storage 10, the contents to be reproduced corresponding to the content identification information, and to store such contents therein (step S217). Upon reception of the storage command while being correlated with the content identification information, the cache servers 300 read the contents to be reproduced corresponding to the received, content identification information, out from the content storage 100.

The cache control unit 660 updates the database 400, and adds the cache server numbers of the cache servers 300 determined in step S216, to the cache server numbers corresponding to the content identification information acquired from the distribution load acquisition unit 650 (step S218). The cache control unit 660 then updates, in the content information storage unit 610, the latest date on which the number of the units of cache servers 300 was increased, among information corresponding to the content identification information acquired from the distribution load acquisition unit 650, into the current date (step S219).

For the case where the necessary number of units of cache server 300 calculated in step S202 is smaller than the current number of units of cache server (step S210: No), the cache control unit 660 compares the maximum value of the distribution band acquired from the distribution load acquisition unit 650 with the second threshold, value. The cache control unit 660 then judges which level of the second threshold value does the distribution band exceeds, and thereby setting a necessary number of units of cache server 300. Each level of the second threshold value is determined typically by subtracting a constant from the first threshold value of each level (step S211). The cache control unit 660 then judges whether the necessary number of units of cache server 300 calculated in step S211 is smaller than the current number of units of cache server 300 acquired from the distribution load acquisition unit 650 (step S220).

If it is smaller (step S220: Yes), the cache control unit 660 reads out from the content information storage unit 610, the latest date on which the number of units of cache server 300 was increased, among information corresponding to the content identification information acquired from the distribution load acquisition unit 650. If a predetermined period has not elapsed from the thus read data (step S221: No), the number of units of cache server 300 is not decreased. On the other hand, if the predetermined period has elapsed from the thus-read date (step S221: Yes), the cache control unit 660 reads the cache server numbers, corresponding to the content identification information acquired from the distribution load acquisition unit 660, out from the content information storage unit 610. The cache control unit 660 then selects the cache servers 300 assigned with the thus-read cache server numbers, that is, the cache servers 300 currently storing the contents to be reproduced related to the judgment, as content storing servers (step S222).

Next, the cache control unit 660 recognizes the cache server numbers of the content storing servers, and reads the load information (or distribution bands) corresponding to the thus-recognized cache server numbers, out from the load information storage unit 630 (step S224). On the other hand, the cache control unit 660 recognizes the difference between the number of units of cache server 300 calculated in step S200 and the current number of units, as the number of units of cache server 300 from which the contents to be reproduced are deleted. The cache control unit 650 then recognizes loads of the individual storing by using the thus-read load information, and selects a necessary number of units of the storing servers in a decreasing order of load. In this we the cache servers 300, from which the contents to be reproduced related to the processing should be deleted, are determined (step S226).

Next, the cache control unit 660 sends the content identification information acquired from the distribution band acquisition unit 650, to the cache servers 300 having the cache server numbers selected in step S226, together with a deletion command which asks the cache servers 300 to delete the contents to be reproduced corresponding to the content identification information (step S227). Door reception of the deletion command while being correlated with the content identification information, the cache servers 300 delete the contents to be reproduced corresponding to the received content identification information.

The cache control unit 660 then updates the database 400, and deletes the cache server numbers of the cache servers 300 determined in step S226, from the cache server numbers stored in the database 400 corresponding to the content identification information acquired from the distribution load acquisition unit 650 (step S228).

Now, there may be a case where the contents to be reproduced, in the process of distribution by the cache servers 300, may be designated as the contents to be deleted from the cache servers 300. In this case, the cache servers 300 execute a process of deleting the contents to be reproduced, upon completion of distribution of the contents to be reproduced. More specifically, the cache servers 300 periodically judge whether the distribution of the designated contents to be reproduced is completed or not and delete the contents to be reproduced only after the completion of the contents to be reproduced is judged.

There may be another case where the access control, device 500 receives the distribution request of the contents to be reproduced, having been designated as the contents to be deleted by the cache servers 300, before the contents to be reproduced are actually deleted. In this case, the distribution servers 200 execute the processes in response to the distribution request.

Figure 11:
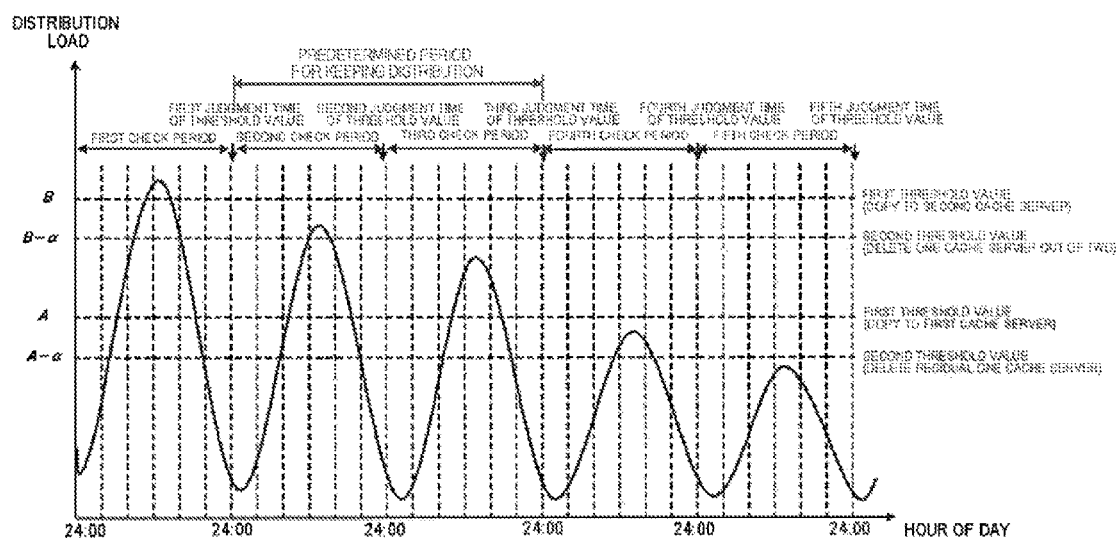
FIG. 11 is a drawing specifically explaining the flows illustrated in FIG. 9 and FIG. 10.

FIG. 11 is a drawing for specifically explaining the flows illustrated in FIG. 9 and FIG. 10. In the drawing, the first threshold value is set to level A, and to level B higher than level A. Level A is a threshold value for judging whether the content to be reproduced should be stored (copied) in a first cache server 300, and level B is a threshold value for judging whether the content to be reproduced should be stored (copied) in a second cache server 300.

The second threshold value is set to level A-α and level B-α. Level B-α is a threshold value for judging whether the content to be reproduced should be deleted from one of two cache servers 300, and level A-α is a threshold value for judging whether the content to be reproduced should be deleted from the remaining one cache server 300 is judged.

The check period explained referring to in FIG. 9 is given as 24 hours in FIG. 11. The content distribution system executes the processes shown in FIG. 9 and FIG. 10 at 24:00 everyday. In an exemplary case illustrated in FIG. 11, in a first check period, the maximum value of the distribution band of the content to be reproduced exceeds level B. Accordingly, at the time of judging the threshold value immediately after the first check period, the cache control unit 660 of the cache server control device 600 increases the number of units of cache server 300, to which the content to be reproduced is copied (cached), by (step S210, and steps S212 to S218).

Thereafter, the distribution band of the content to be reproduced gradually decreases, and the maximum value thereof falls below level B-α in the third check period. However, in the exemplary case illustrated in this drawing, the number of units of cache server 300 is set so as not to be decreased for 48 hours once increased. Accordingly, at the third judgment time of the threshold value, the cache control unit 660 does not execute the process for decreasing the number of units of cache server 300 (step S221: No in FIG. 10).

Also in the following fourth check period, the maximum value of the distribution band of the content to be reproduced still falls below level B-α. The maximum value of the distribution band falls even below level A, but remains higher than level A-α. Accordingly, in the fourth judgment time of threshold value, the cache control unit 660 executes processes of decreasing the number of units of cache server 300 to one, but not to zero (step S222 to step S228 in FIG. 10).

In the following fifth check period, the maximum value of the distribution band of the content to be reproduced falls below level A-α. Accordingly, in the fifth judgment time of threshold value, the cache control unit 660 executes processes of decreasing the number of units of cache server 300 to zero (step S221 to step S228 in FIG. 10).

Next, operations and effects of this embodiment will be explained. In some cases, the distribution band of the content to be reproduced may be kept at almost constant level while repeating slight increase and decrease. In such case, if the same threshold value are used for increase and decrease of the number of units of cache server 300, the increase and decrease of the number of units of cache server 300 may otherwise be repeated again and again. In contrast, according to this embodiment, the second threshold value for judging that the number of units of cache server 300 is decreased is set to be smaller than the first threshold value for judging that the number of units of cache server 300 is decreased. Accordingly, the number of units of cache server 300 may be prevented from repetitively increasing and decreasing, even if the distribution and is kept at almost constant level while repeating slight increase and decrease.

The increase and decrease of the distribution band of the content to be reproduced tend to repeat every predetermined period, and typically every 24 hours. Accordingly, a possibility that the maximum value of load applied to the distribution servers 200 exceeds an allowable value may be suppressed, by calculating the maximum value of the distribution band in every predetermined period (check period), and by comparing such a maximum value with the threshold values to thereby determine the number of units of cache server 300, just like in this embodiment.

The content to be reproduced, which was necessary to increase the number of units of cache server 300 in a certain check period, is very likely to keep at a high level in terms of the number of distribution requests. Nevertheless, for some reason, there may be a case where the number of distribution requests may temporarily decrease. However, in this case, a process may be executed such as decreasing the number of units or cache server 300, upon temporary decrease in the number of distribution requests, and then increasing the number of units of cache server 300 immediately thereafter. In contrast, the cache control unit 660 in this embodiment does not execute the processes for decreasing the number of units of cache server 300, for a predetermined period after increasing the number of units of cache server 300. Accordingly, the number of units of cache server 300 may be prevented from being increased or decreased so often, due to execution of the above-described processes.

On the other hand, the cache control unit 660 of the cache server control device 600 acquires the distribution loads respectively for the contents to be reproduced, and increases the number of units of cache server 300 necessary for caching the contents to be reproduced, if the acquired distribution loads were found to exceed the reference value. As a consequence, since the content distribution system may allow the cache servers 300 to store the contents to be reproduced, causing large distribution loads, even for the case where the bit rates are different depending on the contents to be reproduced, so that the contents to be reproduced may be distributed to the client terminals 20 in a stable manner.

The content information storage unit 610 of the cache server control device 600 stores the bit rates of the contents to be reproduced and the number of distribution requests of the contents to be reproduced, while correlating them with the content identification information, respectively for the plurality of contents to be reproduced. According the cache server control device 600 may readily acquire the distribution bands respectively for the contents to be reproduced. Note that the cache server control device 600 preliminarily acquires the number of reproduction requests of the contents to be reproduced from the access control device 500. The number of distribution requests and the distribution bands may therefore be kept always at latest values.

In the cache server control device 600, the threshold value of the distribution band is set in a multi-level manner. Accordingly, the cache server control device 600 may readily determine the necessary number of units of cache server 300, by judging which level of the threshold value the distribution band exceeds.

In the process of increasing the number of units of cache server 300 for caching certain content to be reproduced, the cache control unit 660 of the cache server control device 600 selects the cache servers 300 in increasing order of load. Such loads may therefore be prevented from concentrating on specific cache servers 300

On the other hand, in the process of decrement lag the number of units of cache server 300 for caching certain content to be reproduced, the cache control unit 660 of the cache server control device 600 selects the cache servers 300 in decreasing order of load. Accordingly, the loads may further be prevented from concentrating on specific cache servers 300.

Second Embodiment

A content distribution system of this embodiment is similar to the content distribution system of the first embodiment, except that the number of issuances of distribution request is used as information representing the distribution load of the contents to be reproduced.

FIG. 12 is a drawing illustrating, in a table form, a data configuration of the content information storage unit 610 in this embodiment. In the example illustrated in the drawing, the content information storage unit 610 is configured similarly to the content distribution system of the first embodiment, except that it does not store the bit rates and distribution bands.

FIG. 13 is a drawing illustrating, in a table form, a data configuration of a load information storage unit 630 in this embodiment. In the example illustrated in this drawing, the load information storage unit 630 stores the quantity of distribution, as the load information respectively for the cache servers 300.

Effects similar to those in the first embodiment may be obtained also by this embodiment. Since there is no need of calculating the distribution bands, the cache server control device 600 may be simplified in the functions thereof, and therefore, the load of the cache server control device 600 may be reduced.

The embodiments of the present invention have been described referring to the attached drawings merely for exemplary purposes, while allowing adoption of various configurations other than those describe in the above.

It is apparent that the present invention is not limited to the above embodiments, which may be modified and changed without departing from the scope and spirit of the invention.

What is claimed is:

1. A cache server control device which is used for a content distribution system,
   said content distribution system comprising:
      a content storage device which stores a plurality of contents to be reproduced, necessary to be distributed to client terminals;
      a distribution server which reads said plurality of contents to be reproduced out from said content storage device and distributes them to said client terminals; and
      a plurality of cache servers which preliminarily store at least one of said plurality of contents to be reproduced, and distribute it to said client terminals, and is configured to judge which of said contents to be reproduced is stored in said cache servers,
   wherein said cache server control device comprises:
   a distribution band acquisition unit which acquires a distribution band, for when concurrently distributing said contents to be reproduced to said plurality of client terminals in response to a plurality of distribution requests issued for said contents to be reproduced, respectively for said plurality of contents to be reproduced; and
   a cache control unit which updates the number of units of cache servers necessary for storing said contents to be reproduced, by comparing said load information acquired by said distribution band acquisition unit with a threshold value determined in a multi-level manner,
   wherein said cache control unit is configured to use:
   a first threshold value of said threshold value when the number of units of said cache servers, for storing said content to be reproduced related to the judgment is increased; and
   a second threshold value of said threshold value, being smaller than the first value, when the number of units of said cache servers, for storing said content to be reproduced related to the judgment is decreased,
   wherein at least one of said plurality of contents to be reproduced has a bit rate different from that of the other contents to be reproduced, and
   said load information representing distribution load represents a distribution band necessary, for when concurrently distributing said contents to be reproduced to said plurality of client terminals in response to a plurality of distribution requests issued for said contents to be reproduced.

2. The cache server control device according to claim 1, wherein said distribution band acquisition unit acquires, in every check period preliminarily determined, a maximum value of said distribution load in said check period, respectively for said contents to be reproduced, and said cache control unit determines the number of units of said cache server necessary for storing said contents to be reproduced, based on the maximum value of said distribution load.

3. The cache server control device according to claim 1, wherein, for the case where the number of units of said cache servers which store one of said contents to be reproduced is increased, said cache control unit does not execute a process for decreasing the number of units of said cache servers which store said one of said contents to be reproduced, for a predetermined period.

4. The cache server control device according to claim 1, wherein said information representing distribution load is the number of distribution requests of said contents to be reproduced.

5. The cache server control device according to claim 1, wherein said plurality of contents to be reproduced are preliminarily assigned with content identification information for identifying them from each other, said cache server control device further comprising:
    a bit rate storage unit which stores bit rates of said contents to be reproduced, while correlating them with said content identification information, respectively for said plurality of contents to be reproduced; and
    a number-of-distribution-request storage unit which stores numbers of distribution requests issued for said contents to be reproduced, while correlating them with said content identification information, respectively for said plurality of contents to be reproduced, and said distribution band is calculated based on said bit rate stored in said bit rate storage unit, and said number of distribution requests stored in said number-of-distribution-request storage unit.

6. The cache server control device according to claim 5, wherein said content distribution system further comprises:
    an access control device which receives, from said client terminals, any one of distribution requests issued for said contents to be reproduced, and back to said client terminals, server specification information which specifies said distribution servers or said cache servers for distributing said contents to be reproduced, and said number-of-distribution-request storage unit receives information which indicates reception of said distribution request from said access control device, while correlating it with said content identification information, and increases said number of distribution requests corresponding to said received content identification information.

7. The cache server control device according to claim 1, further comprising:
    a load information storage unit which stores load of said cache servers, respectively for said plurality of cache servers; and
    a content information storage unit which stores cache information which indicates in which cache servers said contents to be reproduced are stored, respectively for said plurality of cache servers, wherein said cache control unit increases the number of units of said cache servers for storing said contents to be reproduced related to the judgment by:
    selecting said cache servers not storing said contents to be reproduced related to the judgment, as server candidates, based on said cache information, and
    recognizing load of said server candidates respectively, by using said load information, selecting a necessary number of units of said server candidates in increasing order of load, and allowing such server candidates to store said contents to be reproduced related to the processing.

8. The cache server control device according to claim 1, further comprising:
    a load information storage unit which stores load information indicating load of said cache servers, respectively for said plurality of cache servers; and
    a content information storage unit which stores cache information which indicates in which cache servers said contents to be reproduced are stored, respectively for said plurality of contents to be reproduced, wherein said cache control unit decreases the number of units of said cache servers for storing said contents to be reproduced related to the judgment by:
    selecting said cache servers for storing said contents to be reproduced related to the judgment, as content storing servers, based on said cache information, and
    recognizing load of said content storing servers by using said load information, respectively, selecting a necessary number of units of said content storing servers in decreasing order of load, thereby allowing such content servers to delete said contents to be reproduced related to the processing.

9. A content distribution system comprising:
    a content storage device which stores a plurality of contents to be reproduced, which are to be distributed to client terminals;
    a distribution server which reads, a plurality of contents to be reproduced, out from said content storage device and distributes them contents to said client terminals;
    a plurality of cache servers which preliminarily store at least one of said plurality of contents to be reproduced, and distribute it to said client terminals; and
    a cache server control device configured to judge which of said contents to be reproduced is stored in said cache servers, wherein said cache server control device comprises:
    a distribution band acquisition unit which acquires load information representing distribution load, for when concurrently distributing said contents to be reproduced to said plurality of client terminals, in response to a plurality of distribution requests issued for said contents to be reproduced, respectively, for said plurality of contents to be reproduced; and
    a cache control unit which updates the number of units of cache servers necessary for storing said contents to be reproduced, by comparing said load information acquired by said distribution band acquisition unit with a threshold value determined in a multi-level manner, wherein said cache control unit is configured to use:
    uses a first value of said threshold value when the number of units of said cache servers, for storing said content to be reproduced related to the judgment, is increased; and
    uses a second value of said threshold value, being smaller than the first value, when the number of units of said cache servers, for storing said content to be reproduced related to the judgment, is decreased, wherein at least one of said plurality of contents to be reproduced has a bit rate different from that of the other contents to be reproduced, and said load information representing distribution load represents a distribution band necessary, for when concurrently distributing said contents to be reproduced to said plurality of client terminals in response to a plurality of distribution requests issued for said contents to be reproduced.

10. A method of distributing content comprising:

allowing a content storage device to preliminarily store a plurality of contents to be reproduced which are to be distributed to client terminals;

allowing a distribution server to read said plurality of contents to be reproduced out from said content storage device and to distribute them to said client terminals;

allowing a plurality of cache servers to preliminarily store at least one of said plurality of contents to be reproduced, and to send it to said client terminal; and allowing a cache server control device, configured to judge which of said contents to be reproduced is stored in said cache servers, to acquire a distribution load, for when concurrently distributing said contents to be reproduced to said plurality of client terminals, in response to a plurality of distribution requests issued for said contents to be reproduced, respectively for said plurality of contents to be reproduced, and to update the number of units of said cache servers necessary for storing said contents to be reproduced, by comparing the thus-acquired distribution load with a threshold value determined in a multi-level manner, wherein said cache server control device uses:

a first value of said threshold value when the number of units of said cache servers, for storing said content to be reproduced related to the judgment, is increased; and a second value of said threshold value, being smaller than the first value, when the number of units of said cache servers, for storing said content to be reproduced related to the judgment, is decreased, wherein at least one of said plurality of contents to be reproduced has a bit rate different from that of the other contents to be reproduced, and said distribution load represents a distribution band necessary, for when concurrently distributing said contents to be reproduced to said plurality of client terminals in response to a plurality of distribution requests issued for said contents to be reproduced.

11. A non-transitory computer-readable storage medium storing a program for realizing a cache server control device which is used for a content distribution system, said content distribution system comprising:

a content storage device which stores a plurality of contents to be reproduced, necessary to be distributed to client terminals;

a distribution server which reads said plurality of contents to be reproduced out from said content storage device and distributes them to said client terminals; and a plurality of cache servers which preliminarily store at least one of said plurality of contents to be reproduced, and distribute it to said client terminals, and said content distribution is configured to judge which of said contents to be reproduced is stored in said cache servers, and wherein the program is configured to allow a computer to realize:

a function of acquiring load information representing distribution load, for when for concurrently distributing said contents to be reproduced to said plurality of client terminals, in response to a plurality of distribution requests issued for said contents to be reproduced, respectively for said plurality of contents to be reproduced; and a function of updating the number of units of said cache servers necessary for storing said contents to be reproduced, by comparing the thus-acquired distribution load with a threshold value determined in a multi-level manner, wherein the program is further configured to allow a computer to use:

a first value of said threshold value when the number of units of said cache servers, for storing said content to be reproduced related to the judgment, is increased; and a second value of said threshold value, smaller than the first value, when the number of units of said cache servers, for storing said content to be reproduced related to the judgment, is decreased, wherein at least one of said plurality of contents to be reproduced has a bit rate different from that of the other contents to be reproduced, and said load information representing distribution load represents a distribution band necessary, for when concurrently distributing said contents to be reproduced to said plurality of client terminals in response to a plurality of distribution requests issued for said contents to be reproduced.

* * * * *